United States Patent [19]

Byer

[11] Patent Number: 5,673,281

[45] Date of Patent: Sep. 30, 1997

[54] SOLID STATE SYSTEM FOR FREQUENCY CONVERSION USING RAMAN-ACTIVE MEDIA AND NON-LINEAR MEDIA

[75] Inventor: Robert L. Byer, Stanford, Calif.

[73] Assignee: Board of Trustees of the Leland Stanford Junior University, Palo Alto, Calif.

[21] Appl. No.: 646,983

[22] Filed: Apr. 20, 1996

[51] Int. Cl.$^6$ ........................................ H01S 3/30
[52] U.S. Cl. .................. 372/3; 372/22; 372/39; 372/92; 372/34; 372/20; 372/10
[58] Field of Search .................. 372/3, 22, 39, 372/92, 34, 20, 10; 606/3

[56] References Cited

U.S. PATENT DOCUMENTS

| | | | |
|---|---|---|---|
| 4,327,337 | 4/1982 | Liu | 372/3 |
| 5,071,416 | 12/1991 | Heller et al. | 606/3 |
| 5,180,378 | 1/1993 | Kung et al. | 372/3 |
| 5,251,221 | 10/1993 | Stultz et al. | 372/3 |
| 5,457,707 | 10/1995 | Sobey et al. | 372/20 |

Primary Examiner—Leon Scott, Jr.
Attorney, Agent, or Firm—Lumen Intellectual Property Services

[57] ABSTRACT

A solid state system for converting the frequency of light emitted in the form of a laser beam using Stimulated Raman Scattering (SRS) and non-linear conversion. A solid Raman-active medium disposed inside the laser resonator shifts the frequency of the laser beam by a characteristic frequency of the medium to generate a Raman beam in accordance with the SRS effect. Another solid non-linear medium is disposed in the laser resonator for shifting the frequency of the Raman beam to generate an output beam at the desired frequency. The solid non-linear medium is a Second Harmonic Generator (SHG), a Sum Frequency Generator (SFG) or a Difference Frequency Generator (DFG) and can also generate an output beam corresponding to the sum output of the laser beam and the Raman beam. The solid Raman-active medium and the solid-non linear medium can be positioned inside a separate secondary resonator to achieve high conversion efficiency. The system is compatible with Q-switching and frequency tuning for ensuring suitable output beam parameters, and is well-suited for guide star applications.

44 Claims, 5 Drawing Sheets

SOLID STATE SYSTEM FOR FREQUENCY CONVERSION USING RAMAN-ACTIVE MEDIA AND NON-LINEAR MEDIA

FIELD OF THE INVENTION

This invention relates generally to frequency conversion of laser beams, and in particular to a solid state system using both Raman-active media and non-linear media to generate laser beams at the desired frequencies, especially frequencies corresponding to desired emission lines of select alkali metals.

BACKGROUND OF THE INVENTION

The many lasers available today, especially tunable devices, span a considerable range of wavelengths. Still, modern lasers are not capable of generating beams of sufficient quality at all desirable wavelengths. For this reason, frequency shifting or converting systems are used to derive the required frequencies. It is important that such systems produce high quality beams, i.e., beams of high intensity, and exhibit wavelength diversity and agility. In this case, wavelength diversity refers to the ability of producing laser beams at many different wavelengths, while wavelength agility is a measure of the maximum spread of wavelengths.

Techniques for shifting the wavelength of a laser beam are in the prior art. There are a number of elements which are capable of receiving a beam at a particular frequency and shifting it to a different frequency. These elements include Raman media and non-linear optical media.

Raman media are typically gaseous materials such as $D_2$, $H_2$, $N_2O$, $CO_2$, $SF_6$, NO, CO, HBr, $N_2$, etc., as well as solid crystalline media. At the present time, the use of gaseous media for Raman shifting is standard. Crystalline media are used infrequently because of thermal problems and other difficulties involved in adapting them to receive and convert high power laser beams. Stimulated Raman scattering (SRS), i.e., laser-stimulation of scattering in a Raman-active medium, is based on the Raman effect.

An intense laser beam incident on a molecular medium with internal (vibrational or rotational) degrees of freedom will be scattered by that medium in a variety of processes. In one of these, Raman scattering, following an inelastic collision a molecule is left in an excited state, and the scattered photon produced by interaction with that molecule will experience a wavelength shift in accordance with the principle of energy conservation. In the case where the molecule makes a transition to a higher energy level, the photon is scattered with a lower energy than it had when it arrived and thus has a longer wavelength than the incident light. This type of wavelength shift is called a Stokes shift. In the event where the molecular transition is to a lower energy level, the scattered photon carries away the excess energy, and thus has higher energy and longer wavelength than the incident light. The shifting to a longer wavelength is called an "anti-Stokes shift".

Another commonly practiced frequency conversion method takes advantage of light interactions with non-linear media for Sum-and-Difference frequency generation. As two (or more) light waves of frequencies $\omega_1$ and $\omega_2$ pass through a non-linear material (solid or gas) the interaction generates additional waves at frequencies $\omega_1+\omega_2$ and $\omega_1-\omega_2$. Typically, one of these frequencies is selected for use. The Sum-and-Difference process is very general and includes harmonic generation which yields harmonics at integer multiples or, equivalently, at integral fractions of the frequency of the incident beam. In practice, frequency doubling—second harmonic generation (SHG)—and halving is most widespread, since generation of higher order harmonics is complicated and incurs high power losses.

In the prior art either of these two general methods has been used for frequency shifting. For example, P. G. Zverev et al. made a presentation on "Stimulated Raman Scattering of Picosecond Pulses in $Ba(NO_3)_2$ Crystals" at the OSA Proceedings on Advanced Solid-State Lasers, 1993, Vol. 15. The presentation demonstrated that high Raman gain with picosecond pulses could be obtained using $Ba(NO_3)_2$ as the Raman medium. At the same conference in 1995 (Vol. 24), P. G. Zverev et al. discussed in their presentation entitled "Barium Nitrate Raman Laser for Near IR Spectral Region" the qualitative differences of Raman shifters with external and intracavity configuration of the Raman medium. In particular, they showed how adaptation of the resonant cavity could increase the efficiency of SRS.

J. T. Murray et al. in "Eye-Safe Solid-State Intracavity Raman Laser" presented at the OSA Proceedings on Advanced Solid-State Lasers, 1995 Vol. 24 teach an intracavity solid state $Ba(NO_3)_2$ Raman shifter to produce 1.535/ 1.556 μm wavelengths. These wavelengths are "eye-safe".

K. V. Palombo et al. made a presentation on "Wavelength Diversity and Agility by Polarization Tuning of Stimulated Raman Conversion" at the OSA Proceedings on Advanced Solid-State Lasers, 1993, Vol. 15. The authors examined a technique in which multiple Raman cells are used for frequency conversion. They have demonstrated wavelength diversity and agility based on rapidly changing the polarization of the pump beam in systems having one or more Raman cells. In fact, U.S. Pat. No. 5,099,147 was issued to one of the co-authors, E. Greger, on this invention.

Although the above teachings have advanced the state of the art in SRS, they do not address SRS in conjunction with other conversion processes. In fact, none of these references contemplate joining SRS with Sum-and-Difference conversion or generation of harmonics in particular to derive new wavelengths.

E. O. Ammann in his article entitled "Simultaneous Stimulated Raman Scattering and Optical Frequency Mixing in Lithium Iodate" published in Applied Physics Letters 34(12), Jun. 15, 1979 describes how to use SRS for producing high average output power beams at the first and second Stokes lines. His teaching includes information on how to align a Raman medium placed inside a laser resonator for best results and how proper alignment can result in Second Harmonic Generation within the Raman medium in the laser cavity. Unfortunately, this technique is limited by the Raman medium and produces very low-power harmonics.

Finally, Liu in U.S. Pat. No. 4,327,337 addresses SRS in conjunction with SHG to derive wavelengths of interest. Liu's system is specific to gaseous Raman media. The Raman cell is placed in the same cavity as the laser. The output is then passed independently through a SHG element to derive radiation in the visible and infrared spectral regions.

Although this system indicates that SRS can be used in conjunction with SHG, it is designed for gaseous Raman media. Due to leakage and difficulties in controlling Raman gases maintained under pressure the system can not be used in many practical applications. In addition, placing the SHG element outside the cavity results in lower conversion efficiency. Also, Liu teaches the use of gaseous Raman media and single pass external harmonic conversion. This arrangement intrinsically has a low overall conversion efficiency.

In fact, the frequency conversion problem is particularly important in the field of telescope optics. Atmospheric distortions require the use of guide stars to compensate for these distortions in telescopes. One form of guide star, in turn, is best produced by a laser source emitting at the sodium yellow line at 589 nm. Other forms of guide stars can be produced by illuminating the resonance transitions of alkali metals such as K, Li, Rb, or by illuminating other metal atom transitions for metals such as iron, or any metals formed in the upper atmosphere due to meteor bombardment. At present the 589 nm sodium line is most commonly used. In fact, this line is conventionally derived by sum generation of two Nd:YAG lasers. One of these is a frequency-doubled Nd:YAG laser pumped by a dye laser. Such dye lasers require dye fluids which have limited lifetime and are subject to freezing or leaking. The first Nd:YAG emits at 1,064 nm and the second at 1.32 μm. By coincidence these two generate the sum of 589 nm, which is the desired wavelength. However, it is well-known that the summing of two independent lasers requires careful control of the pulse timing such that the process remains efficient. In practice, pulse timing jitter prevents the stable generation of yellow output by sum generation of two Nd:YAG lasers.

Thus, there is no system at the present time, to teach efficient frequency conversion of laser light by a combination of SRS and Sum-and-Difference Generation, including SHG. In particular, what is needed is a solid state system with appropriate parameters and cavity arrangement to enable frequency conversion using SRS and other non-linear techniques. Such system should provide light in a high-quality beam in the visible and infrared spectral regions. In particular, a system of this type should generate the sodium yellow line at 589 nm, which is very important in guide star applications.

OBJECTS AND ADVANTAGES OF THE INVENTION

Accordingly, it is an object of the invention to teach how to use non-linear frequency conversion in a Raman active medium, followed by a non-linear crystal medium for Sum- and-Different Generation, including SHG, to produce output in the visible and infrared spectral regions.

Another object of the invention is to provide a system and method for performing both non-linear conversions within one laser resonator.

Still another object of the invention is to place the Raman crystal and harmonic crystal in a separate cavity such that both conversions take place in a separate cavity from the laser resonator and render the system more flexible and efficient.

Yet another object of the invention is to provide for the nonlinear frequency process to be practiced with solid state equipment without complicated equipment. In this manner, the system can be easily adapted to many technological applications.

Finally, it is an object of the invention is to use the non-linear frequency conversion system and method to shift the frequency of a Nd:YAG laser to the emission lines of alkali atoms such as sodium, potassium, and cesium, and in particular the sodium yellow line at 589 nm.

Other objects and advantages of the invention will be illustrated by the following specification and the drawing figures referenced therein.

SUMMARY OF THE INVENTION

These objects and advantages are attained by a solid state system for converting the frequency of light delivered in the form of a laser beam. The system has a laser resonator inside which a lasing medium, preferably Nd:YAG, Yb:YAG, Nd:Glass, or Ti:Sapphire, is positioned for emitting the laser beam when appropriately stimulated. Upon emission, the laser beam propagates inside the laser resonator. A solid Raman-active medium is also disposed inside the laser resonator. According to the Stimulated Raman Scattering effect (SRS), the solid Raman-active medium shifts the frequency of the laser beam by a characteristic frequency of the medium to generate a Raman beam. Another solid non-linear medium is disposed in the laser resonator for shifting the frequency of the Raman beam to generate an output beam at the desired frequency.

In the preferred embodiment the lasing medium is Nd:YAG, the Raman-active medium is $CaWO_4$ and the solid non-linear medium is a Second Harmonic Generator (SHG), a Sum Frequency Generator (SFG) or a Difference Frequency Generator (DFG). In fact, the solid non-linear medium can also generate an output beam corresponding to the sum output of the laser beam and Raman beam. An output coupling element, e.g., an output coupling mirror is provided for extracting the output beam from the laser resonator. The laser resonator itself is preferably a stable resonator which supports the $TEM_{00}$ mode. A particularly well-suited type of resonator is a bow tie resonator or, in general, any stable curved mirror resonator.

To render the system capable of high average power the Raman-active media are selected to be of adequate length. This ensures that the Raman gain is adequate to overcome the losses of the laser resonator. The laser resonator itself is tuned to the Stokes wavelength, the pump wavelength, or both.

In a practical embodiment the solid Raman-active medium has a zig-zag slab geometry. In other words, the path of the laser beam, once inside the Raman-active medium, will describe a zig-zag trajectory between two surfaces of the medium. This is done to average the thermal heat generated in the Raman-active medium, thereby minimizing thermal lensing. To dissipate the heat created by the laser beam propagating inside the Raman-active medium a cooling apparatus or material is provided on the Raman slab. Preferably, the cooling material is applied on the surfaces which the laser beam strikes while propagating through the Raman-active medium.

Furthermore, the invention provides for a frequency selecting element, such as an etalon, to be placed inside the laser resonator. The etalon can be tilted to tune the frequency of the laser beam according to well-known principles. Also, a lossy element or Q-switching element can be provided inside the laser resonator. The Q-switching element is used to control the power level of the laser beam. Proper adjustment of the power of the laser beam and its pulse duration are essential to efficient frequency conversion in the system according to the invention.

In an alternative embodiment of the invention the laser resonator only contains the lasing medium and a secondary resonator contains the solid Raman-active medium and the solid non-linear medium. The secondary resonator can be contained inside the laser resonator or outside. In the event the secondary resonator is completely outside the laser resonator, the former requires an in-coupling element for admitting the laser beam. Depending on the construction, both cavities require two separate or one common output coupling elements. In the preferred version of the alternative embodiment the secondary resonator has a frequency selecting element, such as an etalon, for adjusting the frequency of the output beam. Also, the secondary resonator, which can be selected from the same group of resonators as the laser resonator in the first embodiment, is tuned to the Stokes frequency of the Raman beam for reducing the Raman threshold for the Raman-active medium. As a result, the frequency conversion in the Raman-active medium is more efficient.

The method of the invention allows to convert the frequency of a laser beam to a desired frequency by performing SRS and a second non-linear conversion, e.g., SHG. For best operation the laser beam used should be in the $TEM_{00}$ mode. Furthermore, the laser beam may be mode-locked for the center of the pulse length and the spectral width of the generated output beam to illuminate the alkali atoms in an efficient manner.

According to a preferred method of the invention the lasing medium is Nd:YAG and the solid Raman-active medium is $CaWO_4$. The non-linear medium is selected such that said output beam has a frequency corresponding to an emission line of an alkali metal selected from the group consisting of sodium, potassium and cesium. In particular, the frequency of the output beam corresponds to the sodium yellow line at 589 nm is the nonlinear medium is a SHG.

The particulars of the invention will be best appreciated upon reading the following description.

DETAILED DESCRIPTION

Figure 1:
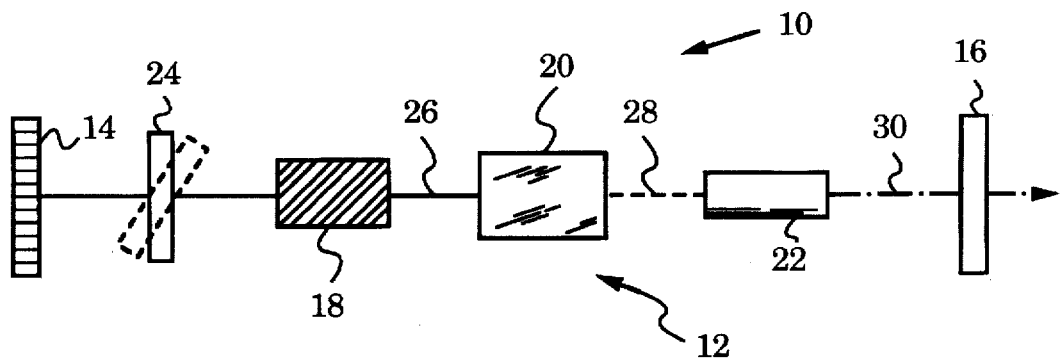
FIG. 1 is a plan side view of a laser resonator according to the invention.

The present invention focuses on solid state systems consisting of solid state components. FIG. 1 illustrates a simple solid state system 10 for frequency conversion according to the invention. System 10 has laser cavity or resonator 12 defined between a high reflector 14 and an output coupler 16. Reflector 14 and or output coupler 16 may be curved or planar, but should be chosen such that resonator 12 supports a $TEM_{00}$ mode.

A lasing medium 18 is positioned inside resonator 12. It is understood that medium 18 can be contained in a suitable cell and that a stimulation or pumping mechanism, e.g., flash lamps or diodes, are provided for stimulating medium 18. Preferably, medium 18 is capable of generating a high-power output which can be mode-locked. Thus, the most suitable materials for medium 18 include Nd:YAG, Yb:YAG, Nd:Glass, and Ti:Sapphire.

A solid Raman-active medium 20 is also disposed inside laser resonator 12. Suitable materials for Raman-active medium 20 include non-linear crystals producing known Raman shifts. For the purposes of this invention $CaWO_4$, KDP (potassium dyhydrogen phosphate) and deuterated KD*P are particularly suitable Raman active media. Many other solid state Raman-active materials, in particular Raman-active crystals, can be found in tables of substances found to exhibit stimulated Raman effect contained in well-known publications, e.g., the CRC Handbook of Laser or the book of Quantum Electronics by Pantell and Puthoff. The Stokes wavelength of all these materials can be shifted by suitable doping techniques or by thermal tuning. A person skilled in the art will know how to use these techniques to derive the appropriate Stokes wavelength from any particular Raman-active medium 20.

A solid non-linear medium 22 is placed to the right of Raman-active medium 20 inside laser resonator 12. Non-linear medium 22 is capable of second harmonic generation (SHG), sum-frequency generation (SFG) or difference-frequency generation (DFG). Solid materials for making non-linear medium 22 are well-known in the art. The most common ones include KDP, KD*P, $LiIO_3$, $LiNbO_3$, $KB_5$, $KB_5O_8$, β-barium borate, lithium triborate, and ammonium dyhydrogen phosphate. The choice of the material will depend on the wavelength and power levels.

Laser resonator 12 also has a frequency selecting element 24, in this case a tiltable etalon. In particular, etalon 24 has a narrow transmission bandwidth in comparison with the gain bandwidth of laser medium 18. Frequency-selecting elements and etalons in particular are well-known in the art. Depending on the operating parameters of system 10 these elements (e.g., prisms, diffraction gratings) can replace etalon 24.

During operation, lasing medium 18 of system 10 is stimulated to emit a laser beam 26. Preferably, laser resonator 12 is designed to ensure that laser beam 26 propagates in the $TEM_{00}$ mode. That is because this fundamental transverse mode is diffraction-limited in its bee propagation and is most suitable for practical applications.

Now, laser beam 26 propagates within laser resonator 12 in both directions, and, on the right it encounters Raman-active medium 20. Inside medium 20 the frequency of laser beam 26 is shifted by the characteristic frequency of medium 20 to produce a Raman beam 28. The frequency of Raman beam 28 will be predominantly at the first Stokes. Other Stokes and anti-Stokes orders are also produced inside medium 20, but exhibit considerably lower intensity. Therefore, for the practical purposes envisioned by the invention, Raman beam 28 is considered to be at the first Stokes. Meanwhile, the other frequency components will be attenuated in the usual manner. Examples of actual frequency shifts are discussed below.

In traveling to the right of medium 20, Raman beam 28 impinges on solid non-linear medium 22. Inside medium 22 Raman beam 28 undergoes another frequency shift and yields an output beam 30. The frequency of output beam 30 will depend on whether medium 22 is an SHG or SFG material. Examples of both will be discussed below in conjunction with actual values for the frequency shifts. Output coupler 16 is transmissive at the frequency of output beam 30. In fact, it is preferable that output coupler 16 be highly transmissive at the frequency of output beam 30 and highly reflective at other frequencies. In this way, laser beam 26 and Raman beam 28 are reflected back into resonator 12. This type of frequency-dependent or selective transmissivity can be easily achieved with coatings well-known to those skilled in the art.

Of course, when output coupler 16 is only transmissive at the frequency of output beam 16, laser beam 26 and Raman beam 28 are trapped inside laser resonator 12. This is not shown in FIG. 1 for reasons of clarity. Keeping laser beam 26 and Raman beam 28 from escaping from resonator 12 results in a highly beneficial build-up of the power intensities of these beams. In turn, increased power levels lead to higher frequency shifting efficiencies in Raman-active medium 20 and non-linear medium 22. Therefore, the overall efficiency of converting laser beam 26 to output beam 30 is increased.

Etalon 24 is used to tune the frequency of laser beam 26 by selecting a desired bandwidth. In general, solid state laser media have gain linewidths on the order of 1 to 5 cm$^{-1}$ (i.e., 30 to 150 GHz). Since etalon 24 has a narrow transmission bandwidth in comparison with the gain bandwidth of laser medium 18, the frequency of light to be Raman shifted and then converted in non-linear medium 22 can be restricted. This is done by tilting etalon 24. Thus, the spectral quality of output beam 30 is further improved by narrowing its bandwidth.

Figure 2:
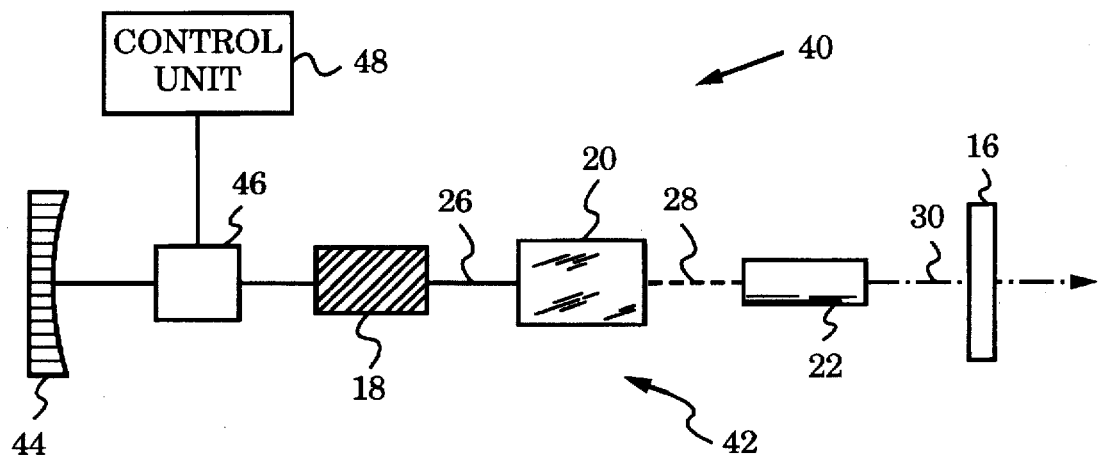
FIG. 2 is a view showing a laser resonator with a Q-switching element according to the invention.

FIG. 2 illustrates another simple embodiment of the invention. Analogous elements in this embodiment are denoted by the same references as in system 10 of FIG. 1. In particular, FIG. 2 shows a solid state system 40 with a hemiconfocal laser resonator 42. On one side resonator 42 has a high reflector 44 in the form of a concave mirror. On the other side resonator 42 has the planar output coupler 16.

Lasing medium 18, solid Raman-active medium 20, and solid nonlinear medium 22 are positioned inside resonator 42. A Q-switching element 46 is positioned to the left of lasing medium 18. A control mechanism or unit 48 is connected to Q-switching element 46. In this embodiment Q-switching element 46 is a modulator, such as an electro-optic or acousto-optic device. Of course, other types of Q-switches compatible with solid state technology can be used as well. Unit 48 controls the transmissivity of Q-switching element electrically.

The operation of system 40 is analogous to the operation of the embodiment of FIG. 1. In addition, Q-switching element 46 allows one to control the Q-factor of resonator 42 to pulse laser beam 26. In response, output beam 30 is also pulsed. Of course, both Q-switching element 46 and etalon 24 can be present inside laser resonator 42. In this manner both the pulse duration and bandwidth of output beam 30 can be adjusted.

Q-switching allows laser beam 26 to reach very high peak power levels, e.g., on the order of 10 MW. This is important because Raman gain inside medium 20 is relatively low, e.g., ≈2 cm/GW for CaWO$_4$ crystals. In the TEM$_{00}$ mode the Q-switching energy is limited to 100 mJ by optical damage incurred above this level. The pulse width of Q-switched laser beam 26 can be around 10 ns. The peak power of Q-switched laser beam 26 is calculated from the quotient 10$^{-1}$J/10$^{-8}$ sec=10 MW. At this peak power laser beam 26 exceeds the Raman threshold of medium 20 and achieves efficient conversion of laser beam 26 to Raman beam 28.

Figure 3:
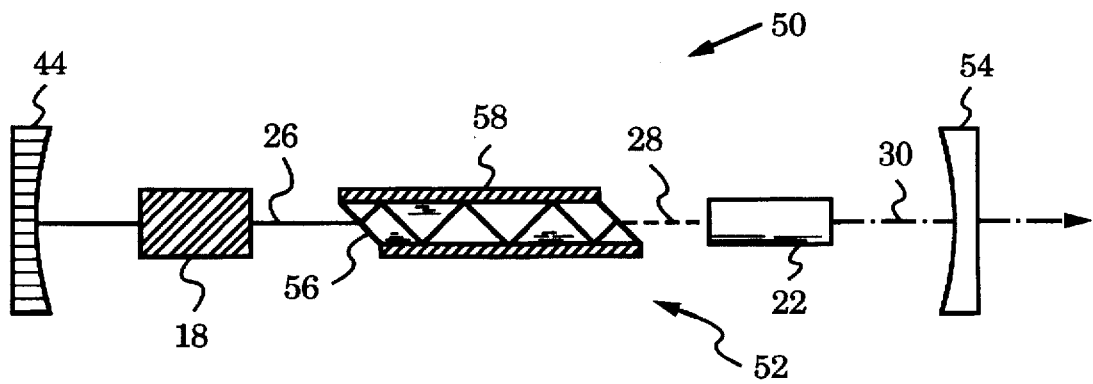
FIG. 3 is a view of a laser resonator with a zig-zag slab according to the invention.

In a third simple embodiment of the invention a solid state system 50, as shown in FIG. 3, has a confocal resonator 52. On the left side resonator 52 is defined by concave mirror 44, and on the right it has an output coupler 54, also in the form of a concave mirror. A solid Raman-active medium 56 used by system 50 has a zig-zag slab geometry. The top and bottom surfaces of slab 56 are coated by a fluid or a layer 58 of cooled solid. Layer 58 is capable of dissipating the heat produced inside slab 56 by laser beam 26 and Raman beam 28 and may, e.g., be made of copper. An additional layer (not shown) may cover slab 56 to ensure higher internal reflection efficiency of beam 26. Protective layers can also be applied on slab 56. The additional advantage of slab 56 is that it extends the path of laser beam 26 inside the Raman-active medium. This ensures more efficient generation of the Stokes wavelength or Raman beam 28.

The embodiment in FIG. 3 is well-suited for operation with high average power laser beam 26. This is because the average power sustainable in slab 56 is not limited by thermally induced focusing but by the thermally induced stress and stress induced fracture of Raman-active medium 56. In fact, the power remaining within slab 56 can be calculated by multiplying the power of laser beam 26 incident on slab 56 by the Stokes frequency and dividing by pump frequency applied to lasing medium 18. As will be shown below, for lasing media such as Nd:YAG this residual power is about 10% of the incident power of laser beam 26. This amount of heat is sufficiently low to be effectively dissipated by cooling layer 58. Thus, the power scaling of system 50 to high power levels is limited by the heat dissipation properties of lasing medium 18, rather than the thermal problems inside Raman-active medium 56.

Figure 4:
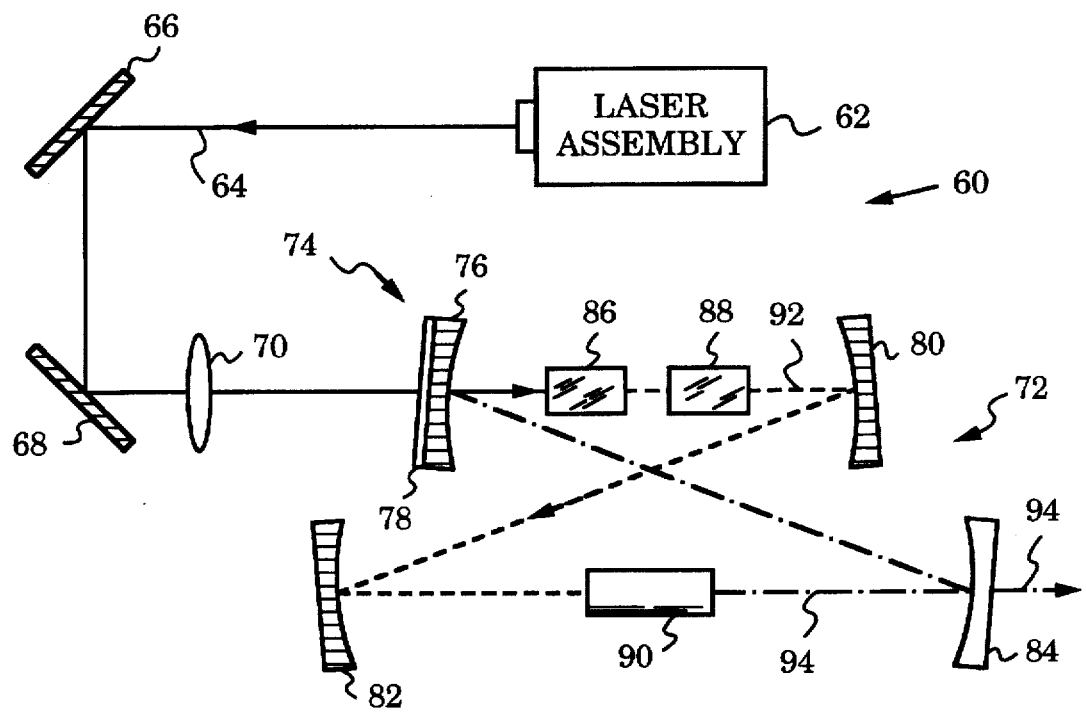
FIG. 4 is a view of a preferred embodiment with a bow tie secondary resonator of the invention.

A practical embodiment of a solid state system 60 is illustrated in FIG. 4. A laser assembly 62 is arranged to deliver laser beam 64. In this embodiment laser assembly 62 is built around a Nd:YAG device emitting at 1,064 nm with a 5 Hz pulse ensured by flash lamp pumping at 5 Hz. Of course, the 5 Hz pulse can be increased to tens of kilohertz depending on application. The bandwidth of laser beam 64 is 134 MHz and its maximum energy level is 300 mJ. At the output of laser system 62 laser beam 64 consists of a 70 ms long train of 350 ps mode-locked pulses with a 7 ns repetition rate. These beam parameters are achieved by the well-known processes of mode-locking, Q-switching, amplifying and filtering. Q-switching and bandwidth control can be obtained with elements analogous to those discussed above in the simple embodiments. The optical elements for performing other functions are contained in laser assembly 62 but are not shown explicitly.

It should be noted that 350 ps mode-locked pulses are particularly suitable for a guide star applications using the 589 nm sodium line. That is because the Fourier transformation of a 350 pulse in time space produces a 1 GHz bandwidth in k space. Meanwhile, 1 GHz is equal to the bandwidth of the 589 nm transition in sodium.

Two deflectors 66 and 68, and a focusing lens 70 are positioned in the path of laser beam 64 for guiding it to a secondary resonator 72. Of course, these optical elements 66, 68 and 70 can be replaced by any other units capable of delivering laser beam 64 to an in-coupling element 74 of secondary resonator 72.

Secondary resonator 72 has a bow tie configuration. The position of in-coupling element 74 is adjusted relative to the focus of lens 70 to mode-match laser beam 64 into resonator 72. In fact, element 74 is a high reflector 76 of concave shape with an anti-reflective coating 78. Coating 78 guarantees efficient in-coupling of laser beam 64 with minimal power losses. The remainder of resonator 72 consists of two concave-shaped high reflectors 80, 82 and a concave output coupler 84. Two solid Raman-active crystals 86 and 88 made of CaWO$_4$ are positioned in the top portion of resonator 72. A frequency doubling non-linear element 90 made of lithium triborate (LBO) occupies the lower portion resonator 72. In this embodiment non-linear element 90 is temperature-tuned.

The preferred embodiment is capable of efficiently converting the wavelength of laser beam 64 from 1.064 nm to 589 nm. The shift takes place inside secondary resonator 72. In particular, after exiting laser assembly 62 laser beam 64 is delivered by deflectors 66, 68 and lens 70 to in-coupling element 74. It then passes through coating 78 and high reflector 76 into resonator 72. Inside resonator 72 Raman-active crystals 86 and 88 of $CaWO_4$ shift the frequency of laser beam 64 to produce a Raman beam 92 at 1,178 nm. From crystals 86 and 88 Raman beam 92 propagates to non-linear element 90, which generates an output beam 94 at twice the frequency of Raman beam 92. Element 90 thus serves as a SHG. The wavelength of output beam 94 is equal to 589 nm; the wavelength of the sodium atom resonance transition.

As in the simple embodiments discussed above, it is preferable that output coupler 84 be transmissive at the wavelength of output beam 94 only. Furthermore, it is also desirable to tune the reflector 76 (or 80, 86) of resonator 72 to the wavelength of Raman beam 92. This reinforces the Stokes shifted beam, yielding output beam 94 of higher power. That is because wavelength tuning of resonator 72 to the Stokes frequency of Raman beam 92 lowers the Raman threshold for Raman-active crystals 86 and 88.

A big advantage associated with using bow tie resonator 72 is its lack of back-reflection into the laser resonator or laser assembly 62. This characteristic makes it easy to preserve the $TEM_{00}$ mode of laser beam 64, and consequently of Raman beam 92 and output beam 94. In fact, mode-matching of laser beam 64 in the $TEM_{00}$ mode into resonator 72 is preferable. A second advantage bow tie resonator 72 is the single direction of propagation of laser beam 64, Raman beam 92 and output beam 94. This yields efficient overall conversion of laser beam 64 to output beam 94. It should be noted, that stable curved mirror resonators, tow which bow tie resonators belong, are preferable for this invention because of their ability to easily sustain a $TEM_{00}$ mode laser.

By virtue of its wavelength and quality output beam 94 is very useful in practice. 589 nm corresponds to an emission and absorption line of sodium. In fact, this particular resonance transition is useful in generating guide stars for optical telescopes. The upper atmosphere contains appreciable quantities of sodium from meteor bombardment. Thus, output beam 94 of system 60 can be directed into the upper atmosphere to stimulate sodium emissions at 589 nm. These emissions can be monitored on the ground and used for correcting the atmospheric distortions in optical telescopes. For optimum use as sodium guide star, output beam 94 should be a diffraction limited beam in the $TEM_{00}$ mode. This mode can be generated and extracted from bow tie resonator 72, as indicated above.

In fact, system 60 of the invention can be tuned to other wavelengths in the visible and infrared spectral range and to the absorption lines of alkali metals in these ranges. This is done by selecting the appropriate lasing medium or laser assembly 62, Raman-active media 86, 88, and solid non-linear medium 90. The most appropriate lasing media, due to the high power and beam quality, include: Nd:YAG, Yb:YAG, Nd:Glass, and Ti:Sapphire. Crystals of $CaWO_4$, KDP (potassium dyhydrogen phosphate) and deuterated KD*P are particularly suitable Raman active media. However, other Raman-active crystals, such as those listed in the CRC Handbook of Lasers can also be used. Finally, KDP, KD*P, $LiIO_3$, $LiNbO_3$, $KB_5$, $KB_5O_8$, β-barium borate, lithium triborate, and ammonium dyhydrogen phosphate can be used in solid non-linear media. A person with average skill in the art knows the frequency shifts produced by the above materials. Using this knowledge, the frequency of output beam 94 can be calculated.

Because system 60 is all solid state it has a long operational lifetime which is essential for many applications. Furthermore, the solid state nature of Raman-active crystals 86 and 88 is key to highly efficient frequency conversion to the Stokes output, i.e., Raman beam 92. However, it is well-known that for every photon generated at the Stokes, there remains in the Raman crystal a Raman phonon which is dissipated as heat. Thus, the quantum efficiency of the Raman converter is limited to the Stokes frequency ratio of the Stokes output frequency to the Laser pump frequency. In the case of Raman shifting Nd:YAG to 1.178 µm from 1.064 µm the quantum efficiency may approach the maximum value of 1.064/1.178. This is a very high theoretical Raman conversion efficiency of 90%. In a practical embodiment a conversion rate in excess of 30% peak power was demonstrated.

Figure 5:
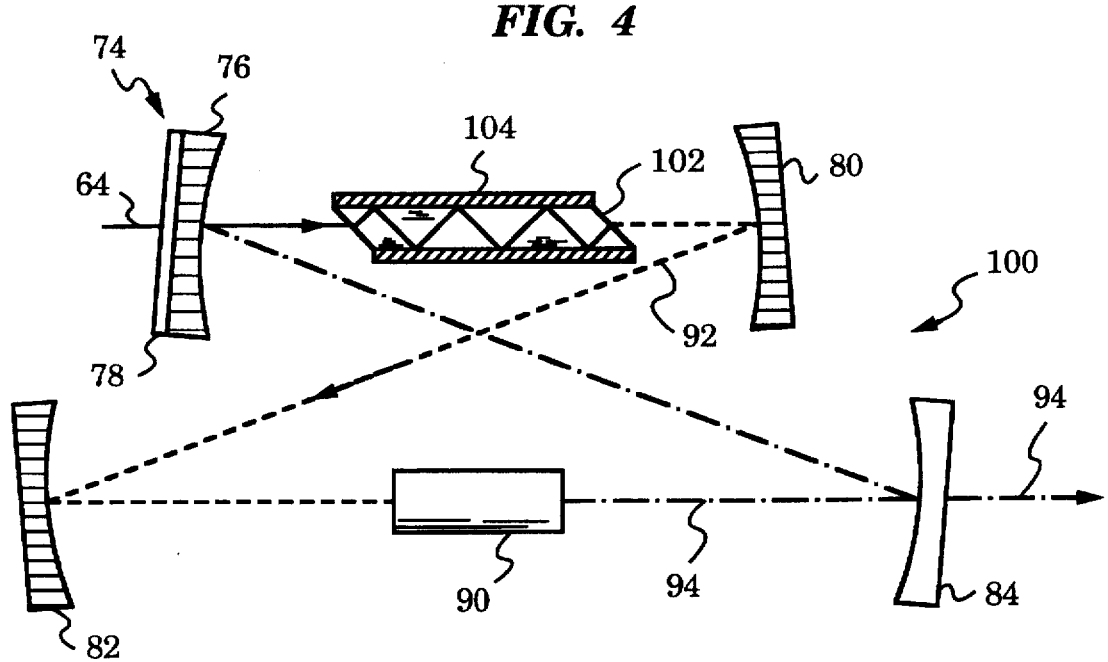
FIG. 5 is a partial view of another bow tie secondary resonator for use in the preferred embodiment of FIG. 5.

Additional improvements can be introduced to the preferred embodiment. FIG. 5 illustrates a bow tie resonator 100 adapted to high power levels. The elements of resonator 100 are the same as in the preferred embodiment. Crystals 86 and 88 are replaced by solid Raman-active medium 102 having a zig-zag slab geometry. A cooling material 104 is disposed on the top and bottom faces of slab 102. As described above, this geometry is advantageous in high power applications. Since laser beam 64 is forced to propagate along a zig-zag path inside slab 102 the latter suffers less thermal stress. In this configuration, output beam 94 can exhibit power levels in excess of 1 kW.

Figure 6:
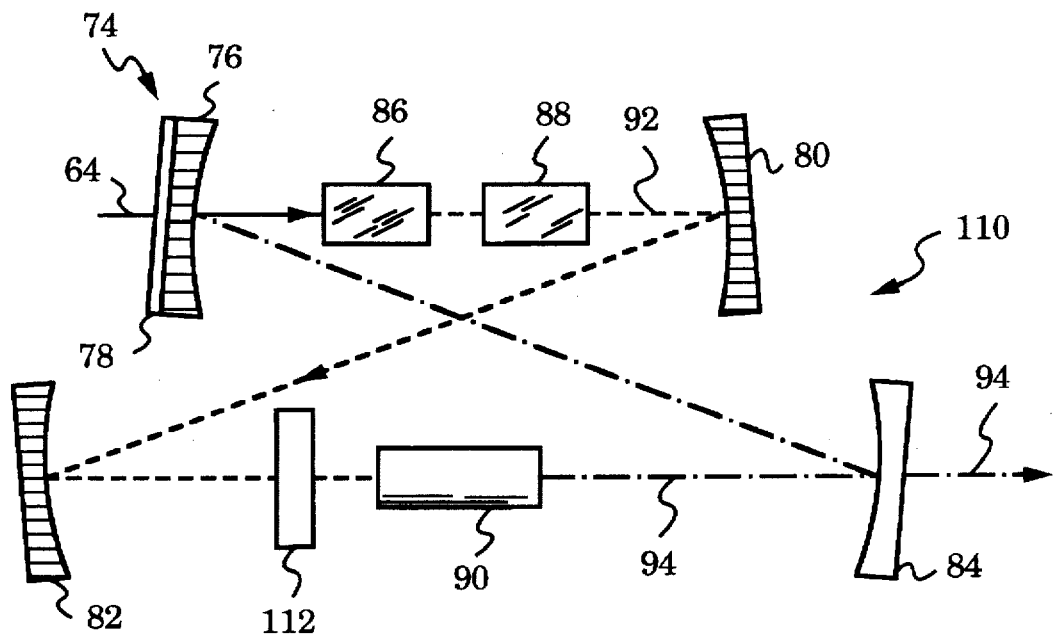
FIG. 6 is a partial view of yet another bow tie secondary resonator for use in the preferred embodiment of FIG. 5.

Another improvement is illustrated in FIG. 6, where a resonator 110, analogous to resonator 72 of FIG. 5, contains an etalon 112. During operation, etalon 112 is used to precisely tune the frequency of Raman beam 92 and therefore the frequency of output beam 94. This is required in cases where the bandwidth of output beam 94 is too wide for the required application or the center wavelength must be tuned to a precise value required for the application.

Figure 7:
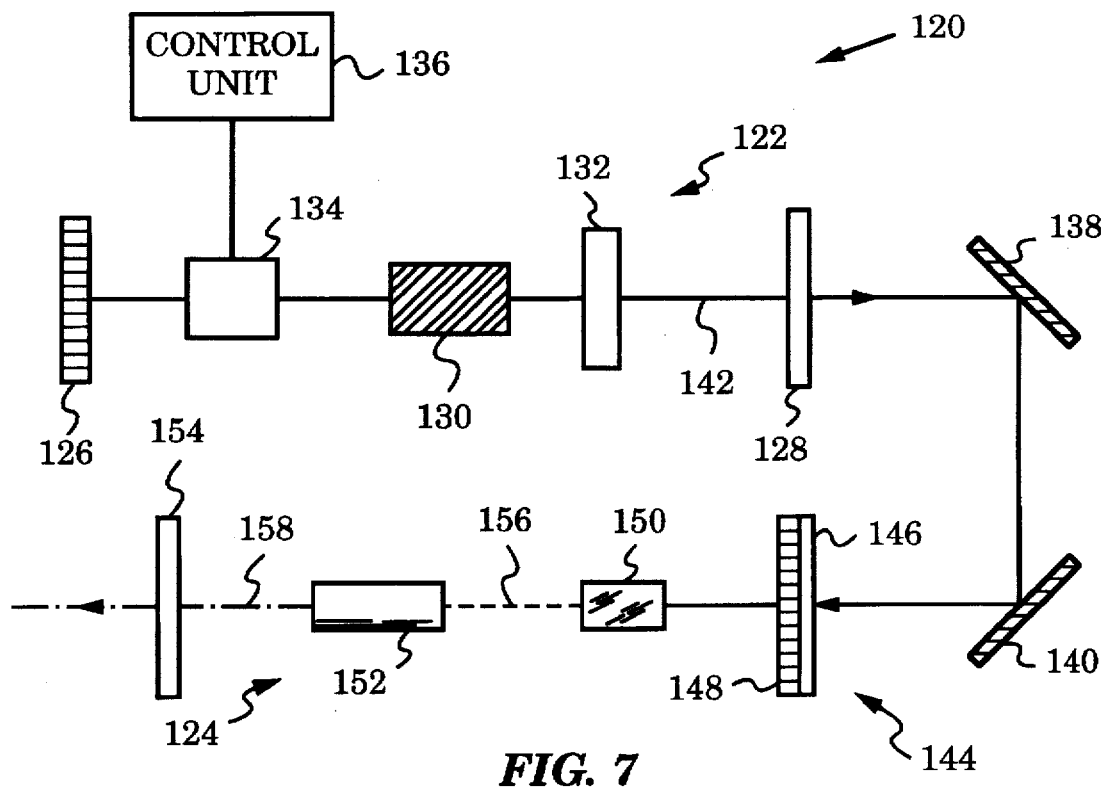
FIG. 7 is a plan side view of an embodiment of the invention using Fabry-Perot resonators.

FIG. 7 illustrates a solid state system 120 with a laser resonator 122 and a secondary resonator 124. Both are of the Fabry-Perot kind. Laser resonator 122 has a high reflector 126 and an output coupler 128. Lasing medium 130 is positioned in the center of laser resonator 122. An etalon 132 is located to the right of lasing medium 130 and a Q-switch 134, controlled by control unit 136, is placed to the left of medium 130.

Two deflectors, 138 and 140 are set up to guide a laser beam 142 from laser resonator 122 to secondary resonator 124. In fact, laser beam 142 is admitted through in-coupling element 144 consisting of a high reflector 148 an anti-reflective coating 146. A solid Raman-active medium 150 and a solid non-linear medium 152 are positioned inside secondary resonator 124. An output coupler 154 is located at the left end of secondary resonator 124.

System 120 operates analogously to the preferred embodiment. Laser beam 142 is first frequency shifted by Raman-active medium 150 to generate a Raman beam 156. Then, Raman beam 156 is again frequency shifted inside non-linear medium 152 to yield an output beam 158. The latter exits secondary resonator 124 through output coupler 154.

Figure 8:
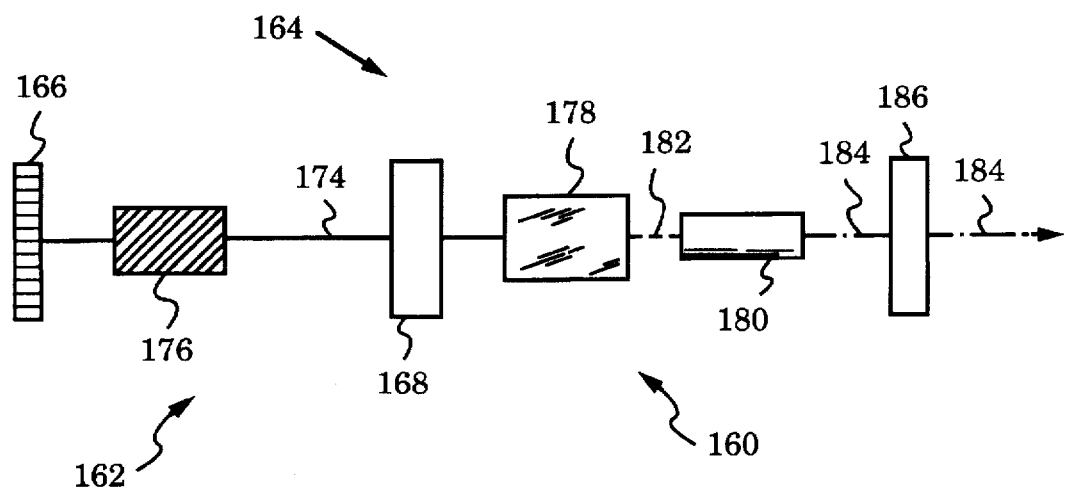
FIG. 8 is a view of another embodiment of the invention.

FIG. 8 shows yet another embodiment of the invention in which a secondary resonator 160 is directly adjacent to a laser resonator 162 of a solid state system 164. Laser resonator 162 has a regular high reflector 166 and a first output coupler 168. The latter is transmissive to a laser beam 174 generated by a lasing medium 176. Thus, laser beam 174 is admitted through first output coupler 168 into secondary cavity 160. A solid Raman-active medium 178 and a solid non-linear crystal 180 are found inside secondary cavity 160. The two generate Raman beam 182 and output beam 184 respectively. A second output coupler 186, transmissive only to the frequency of output beam 184 permits the latter to exit. For proper operation, first output coupler 168 is highly reflective at the frequency of Raman beam 182 and output beam 184. The attractive feature of this embodiment is its simplicity and the collinear alignment of resonators 160 and 162. Mode-locking and preserving the $TEM_{00}$ mode in all beams is particularly easy in this arrangement.

Figure 9:
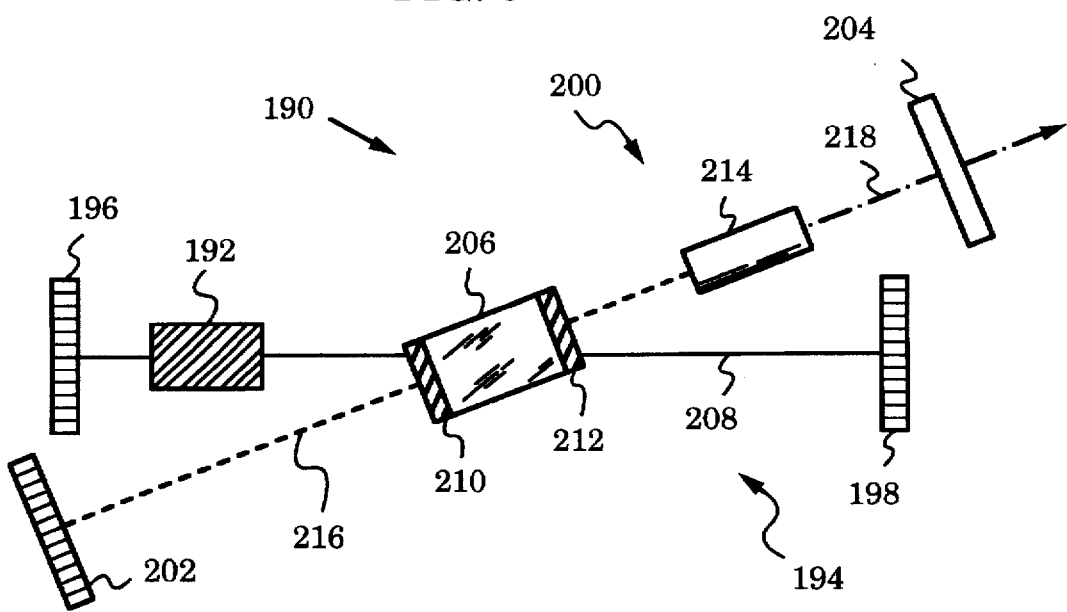
FIG. 9 is a view of an embodiment of the invention in which a solid Raman-active medium is irradiated at an angle.

It is well-known that the stimulated Raman process does not require phase velocity matching. That is, the pump laser source does not have to be collinear with the generated Stokes output for Raman gain. The invention takes advantage of this fact in the embodiment of FIG. 9. Here, a system 190 has a lasing medium 192 positioned inside laser resonator 194 defined by two high reflectors 196 and 198. During operation a laser beam 208 propagates inside resonator 194.

A secondary resonator 200 with a high reflector 202 and an output coupler 204 is oriented at an angle to laser resonator 194. A solid Raman-active medium 206 is positioned inside secondary resonator 200 aslant to the path of laser beam 208. As is known in the art, the inclination of Raman-active medium 206 with respect to laser beam 208 can be varied to achieve most efficient conversion of laser beam 208 to a Raman beam 216. Furthermore, Raman-active medium 206 has anti-reflective coatings 210 and 212 on the faces through which laser beam 208 enters and exits in order to prevent reflections and scattering.

A solid non-linear medium 214 is positioned inside secondary resonator 200. Medium 214 transforms Raman beam 216 into an output beam 218, which exits through output coupler 204.

Figure 10:
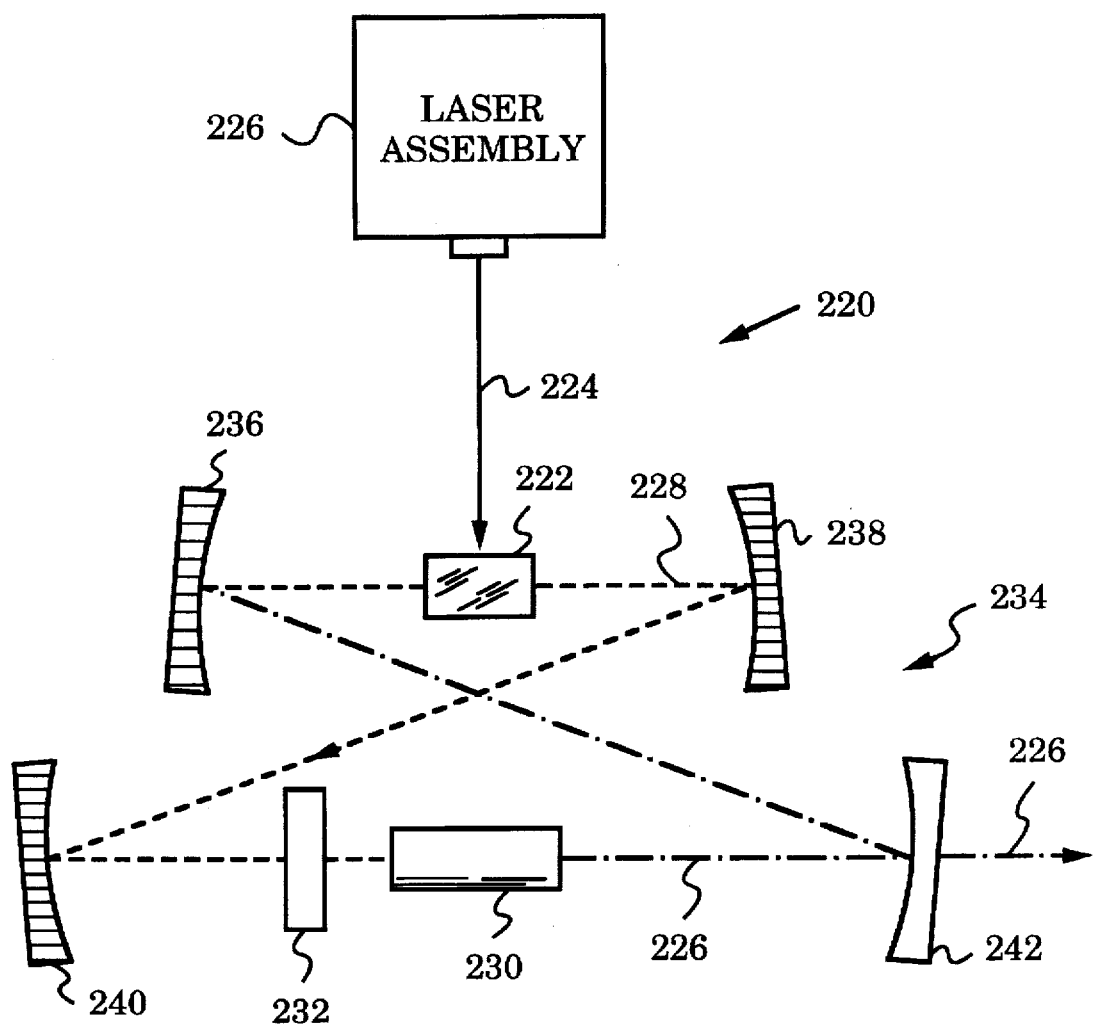
FIG. 10 is a view of a side-pumped solid Raman-active medium.

Finally, in FIG. 10, a system 220 is arranged for side-pumping of a solid Raman-active medium 222. As in one of the previous embodiments, Raman medium 222 is contained in a bow tie cavity 234. Three high reflectors 236, 238, and 240 as well as an output coupler 242 define cavity 234.

A laser beam 224 is obtained from a laser assembly 226. Laser beam 224 is incident on Raman-active medium 222 approximately at a right angle. Of course, the actual angle of incidence may vary. In fact, the best angle is adjusted to yield the desired quality output beam 226 generated from a Raman beam 228. A solid non-linear element 230 and an etalon 232 are included inside cavity 234 for non-linear conversion and bandwidth tuning of Raman beam 228.

It will be clear to one skilled in the art that the above embodiment may be altered in many ways without departing from the scope of the invention. In fact, elements of the various embodiments can be substituted and interchanged. Furthermore, the gain linewidth of the solid Raman-active media can be further tuned by varying the temperature, crystal composition, doping, etc. This will ensure that the output beam produced has the desired bandwidth and quality. Accordingly, the scope of the invention should be determined by the following claims and their legal equivalents.

What is claimed is:

1. A solid state system for converting the frequency of a laser beam, said system comprising:

a) a laser resonator;

b) a lasing medium positioned inside said laser-resonator for emitting said laser beam upon stimulation, such that said laser beam propagates within said laser resonator;

c) a solid Raman-active medium disposed inside said laser resonator for shifting the frequency of said laser beam by a characteristic frequency of said solid Raman-active medium to generate a Raman beam;

d) a solid non-linear medium disposed inside said laser resonator for shifting the frequency of said Raman beam to generate an output beam; and e) an output coupling means for extracting said output beam from said laser resonator.

2. The solid state system of claim 1 wherein said solid Raman-active medium has a zig-zag slab geometry, thereby causing said laser beam to propagate through said Raman-active medium along a zig-zag path.

3. The solid state system of claim 2 further comprising a cooling means positioned on said solid Raman-active medium for dissipating the heat produced inside said solid Raman-active medium by said laser beam.

4. The solid state system of claim 1 wherein said laser resonator further comprises a frequency selecting element for tuning the frequency of said laser beam.

5. The solid state system of claim 1 wherein said lasing medium is selected from the group consisting of Nd:YAG, Yb:YAG, Nd:Glass, Ti:Sapphire.

6. The solid state system of claim 1 wherein said lasing medium is Nd:YAG, said solid Raman-active medium is selected from the group consisting of $CaWO_4$, KDP, KD*P, and Raman-active crystals and said solid non-linear medium is a Second Harmonic Generator.

7. The solid state system of claim 1 wherein said lasing medium is Nd:YAG, said solid Raman-active medium is selected from the group consisting of $CaWO_4$, KDP, KD*P, and Raman-active crystals and said solid non-linear medium is a Sum-and-Difference Frequency Generator.

8. The solid state system of claim 1 wherein said laser resonator is selected from the group consisting of bow tie resonators, confocal resonators, hemiconfocal resonators, and stable curved mirror resonators.

9. The solid state system of claim 1 wherein said laser resonator comprises a Q-switching element for controlling the peak power level of said laser beam.

10. The solid state system of claim 1 wherein said laser resonator comprises a mode-locking element for controlling the peak power level of said laser beam.

11. A solid state system for converting the frequency of a laser beam, said system comprising:

a) a laser resonator;

b) a lasing medium positioned inside said laser resonator for emitting said laser beam upon stimulation, such that said laser beam propagates within said laser resonator;

c) a secondary resonator located inside said laser resonator, said secondary resonator comprising an incoupling means for admitting said laser beam into said secondary resonator;

d) a solid Raman-active medium disposed inside said secondary resonator for shifting the frequency of said laser beam by a characteristic frequency of said solid Raman-active medium to generate a Raman beam;

e) a solid non-linear medium disposed inside said secondary resonator for shifting the frequency of said Raman beam to generate an output beam; and f) a first output coupling means for extracting said output beam from said secondary resonator; and g) a second output coupling means for extracting said output beam from said laser resonator.

12. The solid state system of claim 11 wherein said solid Raman-active medium has a zig-zag slab geometry, thereby causing said laser beam to propagate through said Raman-active medium along a zig-zag path.

13. The solid state system of claim 12 further comprising a cooling means positioned on said solid Raman-active medium for dissipating the heat produced inside said solid Raman-active medium by said laser beam.

14. The solid state system of claim 11 wherein said laser resonator further comprises a frequency selecting element for tuning the frequency of said laser beam.

15. The solid state system of claim 11 wherein said secondary resonator further comprises a frequency selecting element for tuning the frequency of said Raman beam.

16. The solid state system of claim 11 wherein said lasing medium is selected from the group consisting of Nd:YAG, Yb:YAG, Nd:Glass, Ti:Sapphire.

17. The solid state system of claim 11 wherein said lasing medium is Nd:YAG, said solid Raman-active medium is selected from the group consisting of $CaWO_4$, KDP, KD*P, and Raman-active crystals and said solid non-linear medium is a Second Harmonic Generator.

18. The solid state system of claim 11 wherein said lasing medium is Nd:YAG, said solid Raman-active medium is selected from the group consisting of $CaWO_4$, KDP, KD*P, and Raman-active crystals and said solid non-linear medium is a Sum-and-Difference Frequency Generator.

19. The solid state system of claim 11 wherein said secondary resonator is tuned to the Stokes frequency of said Raman beam, thereby reducing the Raman threshold for said Raman-active medium.

20. The solid state system of claim 11 wherein said laser resonator and said secondary resonator are selected from the group consisting of bow tie resonators, confocal resonators, hemiconfocal resonators, and stable curved mirror resonators.

21. The solid state system of claim 11 Wherein said laser resonator comprises a Q-switching element for controlling the peak power level of said laser beam.

22. The solid state system of claim 11 wherein said laser resonator comprises a mode-locking element for controlling the peak power level of said laser beam.

23. A solid state system for converting the frequency of a laser beam, said system comprising:
   a) a laser resonator;
   b) a lasing medium positioned inside said laser resonator for emitting said laser beam upon stimulation, such that said laser beam propagates within said laser resonator;
   b) an output coupling means for extracting said laser beam from said laser resonator;
   c) a secondary resonator comprising an in-coupling means for admitting said laser beam into said secondary. resonator;
   d) a solid Raman-active medium disposed inside said secondary resonator for shifting the frequency of said laser beam by a characteristic frequency of said solid Raman-active medium to generate a Raman beam;
   e) a solid non-linear medium disposed inside said secondary resonator for shifting the frequency of said Raman beam to generate an output beam; and
   f) an output coupling means for extracting said output beam from said secondary resonator.

24. The solid state system of claim 23 wherein said solid Raman-active medium has a zig-zag slab geometry, thereby causing said laser beam to propagate through said Raman-active medium along a zig-zag path.

25. The solid state system of claim 24 further comprising a cooling means positioned on said solid Raman-active medium for dissipating the heat produced inside said solid Raman-active medium by said laser beam.

26. The solid state system of claim 23 wherein said laser resonator further comprises a frequency selecting element for tuning the frequency of said laser beam.

27. The solid state system of claim 23 wherein said secondary resonator further comprises a frequency selecting element for tuning the frequency of said Raman beam.

28. The solid state system of claim 23 wherein said lasing medium is selected from the group consisting of Nd:YAG, Yb:YAG, Nd:Glass, Ti:Sapphire.

29. The solid state system of claim 23 wherein said lasing medium is Nd:YAG, said solid Raman-active medium is selected from the group consisting of $CaWO_4$, KDP, KD*P, and Raman-active crystals and said solid non-linear medium is a Second Harmonic Generator.

30. The solid state system of claim 23 wherein said lasing medium is Nd:YAG, said solid Raman-active medium is selected from the group consisting of $CaWO_4$, KDP, KD*P, and Raman-active crystals and said solid non-linear medium is a Sum-and-Difference Frequency Generator.

31. The solid state system of claim 23 wherein said secondary resonator is tuned to the Stokes frequency of said Raman beam, thereby reducing the Raman threshold for said solid Raman-active medium.

32. The solid state system of claim 23 wherein said laser resonator and said secondary resonator are selected from the group consisting of bow tie resonators, confocal resonators, hemiconfocal resonators, and stable curved mirror resonators.

33. The solid state system of claim 23 wherein said laser resonator comprises a Q-switching element for controlling the peak power level of said laser beam.

34. The solid state system of claim 23 wherein said laser resonator comprises a mode-locking element for controlling the peak power level of said laser beam.

35. A method for converting the frequency of a laser beam using a solid state system, said method comprising the following steps:
   a) stimulating a lasing medium positioned inside a laser resonator to emit a laser beam, such that said laser beam propagates within said laser resonator;
   b) shifting the frequency of said laser beam by using a solid Raman-active medium positioned inside said laser resonator, such that the frequency of said laser beam is shifted by a characteristic frequency of said solid Raman-active medium to generate a Raman beam;
   c) shifting the frequency of said Raman beam by using a solid non-linear medium positioned inside said laser resonator to generate an output beam; and
   d) extracting said output beam from said laser resonator.

36. The method of claim 35 wherein said laser beam propagates in the $TEM_{00}$ mode.

37. The method of claim 35 wherein said laser beam is mode-locked.

38. The method of claim 35 wherein said lasing medium is Nd:YAG and said solid Raman-active medium is selected from the group consisting of $CaWO_4$, KDP KD*P, and Raman-active crystals and said non-linear medium is selected such that said output beam has a frequency corresponding to an emission line of an alkali metal selected from the group consisting of sodium, potassium and cesium.

39. The method of claim 38 wherein the frequency of said output beam corresponds to the sodium yellow line at 589 nm and said output beam is used for guide star applications to correct the atmospheric distortions of optical telescopes.

40. A method for converting the frequency of a laser beam using a solid state system, said method comprising the following steps:

a) stimulating a lasing medium positioned inside a laser resonator to emit a laser beam, such that said laser beam propagates within said laser resonator;

b) extracting said laser beam from said laser resonator;

c) admitting said laser beam into a secondary resonator;

d) shifting the frequency of said laser beam inside said secondary resonator by using a solid Raman-active medium positioned inside said secondary resonator, such that the frequency of said laser beam is shifted by a characteristic frequency of said solid Raman-active medium to generate a Raman beam;

e) shifting the frequency of said Raman beam by using a solid non-linear medium positioned inside said secondary resonator to generate an output beam; and f) extracting said output beam from said secondary resonator.

41. The method of claim 40 wherein said laser beam propagates in the $TEM_{00}$ mode and is mode-matched into said secondary resonator.

42. The method of claim 40 wherein said laser beam is mode-locked.

43. The method of claim 40 wherein said lasing medium is Nd:YAG and said solid Raman-active medium is selected from the group consisting of $CaWO_4$, KDP, KD*P, and Raman-active crystals and said non-linear medium is selected such that said output beam has a frequency corresponding to an emission line of an alkali metal selected from the group consisting of sodium, potassium and cesium.

44. The method of claim 43 wherein the frequency of said output beam corresponds to the sodium yellow line at 589 nm and said output beam is used for guide star applications to correct the atmospheric distortions of optical telescopes.

* * * * *